US008734968B2

(12) United States Patent
Chae et al.

(10) Patent No.: US 8,734,968 B2
(45) Date of Patent: May 27, 2014

(54) MICRO-SIZED MICROBIAL FUEL CELL

(75) Inventors: Junseok Chae, Phoenix, AZ (US);
Bruce E. Rittmann, Tempe, AZ (US);
Seokheun Choi, Phoenix, AZ (US);
Hyung-Sool Lee, Waterloo (CA)

(73) Assignee: Arizona Board of Regents, a body corporated of the State of Arizona acting for and on behalf of Arizona State University, Scottsdale, AZ (US)

( * ) Notice: Subject to any disclaimer, the term of this patent is extended or adjusted under 35 U.S.C. 154(b) by 414 days.

(21) Appl. No.: 13/153,110

(22) Filed: Jun. 3, 2011

(65) Prior Publication Data

US 2011/0300455 A1    Dec. 8, 2011

Related U.S. Application Data

(60) Provisional application No. 61/351,234, filed on Jun. 3, 2010.

(51) Int. Cl.
*H01M 8/16* (2006.01)

(52) U.S. Cl.
USPC ................................. 429/2; 429/401

(58) Field of Classification Search
USPC ....................................... 429/2, 401
See application file for complete search history.

(56) References Cited

U.S. PATENT DOCUMENTS

2010/0092804 A1* 4/2010 Borole ............................ 429/2

OTHER PUBLICATIONS

Wang et al., "Micro-sized microbial fuel cell: A mini-review" Bioresource Tech. 102 (2011) 235-243.*
Lovley D et al. "Electricity Production by Geobacter sulfurreducens Attached to Electrodes" Applied and Environmental Microbiology, Mar. 2003, vol. 69, No. 3, pp. 1548-1555.
Rittmann B et al. "Effects of Substrate Diffusion and Anode Potential on Kinetic Parameters for Anode-Respiring Bacteria" Environ. Sci. Technol. 2009, 43, pp. 7571-7577.
Choi S. et al. "A μL-scale micromachined microbial fuel cell having high power density" Lab Chip, 2011, 11, pp. 1110-1117.
Torres C et al. "A kinetic perspective on extracellular electron transfer by anode-respiring bacteria" FEMS Microbiol Rev 34 (2010) pp. 3-17.
Logan B "Exoelectrogenic bacteria that power microbial fuel cells" Nature Reviews, Microbiology vol. 7, May 2009, pp. 375-381.
Logan B et al. "Microbial fuel cells-challenges and applications" Environmental Science & Technology, Sep. 1, 2006, pp. 5172-5180.

(Continued)

*Primary Examiner* — Zachary Best
(74) *Attorney, Agent, or Firm* — Fish & Richardson P.C.

(57) ABSTRACT

A microbial fuel cell includes an anode portion having an anode and a cathode portion having a cathode. The anode is configured to support an electrically conductive biofilm matrix. A cation exchange membrane is positioned between the anode and the cathode. The anode portion and the cation exchange membrane define an anode chamber having a volume of between about 1 μL and about 100 μL and configured to receive an anolyte. The cathode portion and the cation exchange membrane define a cathode chamber having a volume of between about 1 μL and about 100 μL and configured to receive a catholyte. The microbial fuel cell is configured to achieve a Coulombic efficiency of at least 30% and/or a power density of at least of 4.7 μW/cm². The microbial fuel cell is a microelectromechanical system and can be fabricated in an automated production process.

14 Claims, 7 Drawing Sheets

(56) References Cited

OTHER PUBLICATIONS

Chiao M et al. "A miniaturized microbial fuel cell" Solid-State Sensor, Actuator and Microsystems Workshop Hilton Head Island, South Carolina, Jun. 2-6, 2002, pp. 59-60.
Chiao M et al. "Micromachined Microbial Fuel Cells" Proceedings of 16th IEEE International Conference on Micro Electro Mechanical Systems (MEMS), Kyoto, Japan, 2003, pp. 383-386.
Chiao M et al. "Micromachined microbial and photosynthetic fuel cells" Journal of Micromechanics and Microengineering 16 (2006) pp. 2547-2553.
Torres C et al. "Selecting Anode-Respiring Bacteria Based on Anode Potential: Phylogenetic, Electrochemical, and Microscopic Characterization" Environ. Sci. Technol. 2009 43, pp. 9519-9524.
Qian F et al. "A 1.5 μL microbial fuel cell for on-chip bioelectricity generation" Lab Chip, 2009, 9, pp. 3076-3081.
Parra E et al. "Microbial fuel cell based on electrode-exoelectrogenic bacteria interface" Proceedings of 22nd IEEE International Conference on Micro Electro Mechanical Systems (MEMS), Sorrento, Italy, 2009, pp. 31-34.
Hou H et al. "Microfabricated Microbial Fuel Cell Arrays Reveal Electrochemically Active Microbes" PLoS ONE, Aug. 1, 2009, vol. 4, Issue 8, e6570, pp. 1-8.
Parra E et al. "Real-time biocatalyst loading and electron transfer via microfabricated transparent electrode" Proceedings of 23rd IEEE International Conference on Micro Electro Mechanical Systems (MEMS), Hong Kong, 2010, pp. 1183-1186.
Logan B "Scaling up microbial fuel cells and other bioelectrochemical systems" Appl Microbiol Biotechnol (2010) 85: pp. 1665-1671.
Torres C et al. "Kinetics of Consumption of Fermentation Products by Anode-Respiring Bacteria" Appl Microbiol Biotechnol (2007) 77, pp. 689-697.
Pant D et al. "A review of the substrates used in microbial fuel cells (MFCs) for sustainable energy production" Bioresource Technology 101 (2010) pp. 1533-1543.
Lovley D et al. "Electricity production with electricigens" in: J. Wall et al. (Eds.), Bioenergy, ASM Press, Washington, DC., 2008, pp. 295-306.
Marsili E et al. "Shewanella secretes flavins that mediate extracellular electron transfer" Proceedings of the National Academy of Sciences of the United States of America, PNAS, Mar. 11, 2008, vol. 105, No. 10, pp. 3968-3973.
Pham T et al. "Use of *Pseudomonas* species producing phenazine-based metabolites in the anodes of microbial fuel cells to improve electricity generation" Appl Microbiol Biotechnol (2008) 80: pp. 985-993.
Dumas C et al. "DSA to grow electrochemically active biofilms of Geobacter sulfurreducens" Electrochimica Acta (2008) 53, pp. 3200-3209.
Torres C et al. "Carbonate Species as OH-Carriers for Decreasing the pH Gradient between Cathode and Anode in Biological Fuel Cells" Environ. Sci. Technol. 2008,42, pp. 8773-8777.
Lin W et al. "Geobacter sulfurreducens can grow with oxygen as terminal electron acceptor" Applied and Environmental Microbiology, Apr. 2004, vol. 70, No. 4, pp. 2525-2528.
Park J et al. "A microsystem for sensing and patterning oxidative microgradients during cell culture" Lab Chip, 2006, 6, pp. 611-622.
Wang H et al. "Micro-sized microbial fuel cell: a mini-review" Bioresource Technology 102 (2011) pp. 235-243.
Lee H et al. "Evaluation of energy-conversion efficiencies in microbial fuel cells (MFCs) utilizing fermentable and non-fermentable substrates" Water Research 42, (2007), pp. 1501-1510.
Arrigan et al. "A study of L-cysteine adsorption on gold via electrochemical desorption and copper(II) ion complexation" Analyst, 1999, 124, pp. 1645-1649.
Rozendal R et al. "Effects of membrane cation transport on pH and microbial fuel cell performance" Environ. Sci. Technol. 2006, 40, pp. 5206-5211.
Min B et al. "Electricity generation using membrane and salt bridge microbial fuel cells" Water Research 39 (2005) pp. 1675-1686.
Fiorini G et al. "Rapid prototyping of thermoset polyester microfluidic devices" Anal. Chem. 2004, 76, pp. 4697-4704.
Das C et al. "Device fabrication and Integration with photodefinable microvalves for protein separation" Sensors and Actuators A 134 (2007) pp. 271-277.
Aoki T et al. "Improvement of oxygen permselectivity through polydimethylsiloxane and poly(1-trimethylsilylpropyne) films by the addition of a small amount of poly(trifluoromethyl substituted arylacetylene)" Journal of Membrane Science, 51 (1991) pp. 207-216.
Oh S et al. "Effects of applied voltages and dissolved oxygen on sustained power generation by microbial fuel cells" Water Science & Technology 60.5, 2009, pp. 1311-1317.
He Z et al. "Electricity production coupled to ammonium in a microbial fuel cell" Environ. Sci. Technol. 2009, 43, pp. 3391-3397.
Watson V et al. "Power production in MFCs inoculated with *Shewanella oneidensis* MR-1 or mixed cultures" Biotechnology and Bioengineering, vol. 105, No. 3, Feb. 15, 2010, pp. 489-498.
Raghavulu S et al. "Effect of anodic pH microenvironment on Microbial Fuel Cell (MFC) performance in concurrence with aerated and ferricyanide catholytes" Electrochemistry Communications 11 (2009) pp. 371-375.
Mohan S et al. "Integrated function of microbial fuel cell (MFC) as bio-electrochemical treatment system associated with bioelectricity generation under higher substrate load" Biosensors and Bioelectronics 24, (2008), pp. 2021-2027.
Crittenden S et al. "Mediating electron transfer from bacteria to a gold electrode via a self-assembled monolayer" Langmuir 2006, 22, pp. 9473-9476.
Logan B et al. "Separator Characteristics for Increasing Performance of Microbial Fuel Cells" Environ. Sci. Technol. 43 (21), pp. 8456-8461.
Lee H et al. "Significance of Biological Hydrogen Oxidation in a Continuous Single-Chamber Microbial Electrolysis Cell" Environ. Sci. Technol. 2010, 44, pp. 948-954.
Cheng K et al. "Affinity of Microbial Fuel Cell Biofilm for the Anodic Potential" Environ. Sci. Technol. 2008, 42, pp. 3828-3834.
Freguia S et al. "Electron and Carbon Balances in Microbial Fuel Cells Reveal Temporary Bacterial Storage Behavior During Electricity Generation" Environ. Sci. Technol. 2007, 41, pp. 2915-2921.
Fan Y et al. "Quantification of the internal resistance distribution of microbial fuel cells" Environ. Sci. Technol. 2008, 42, pp. 8101-8107.
Harnisch F et al. "The suitability of monopolar and bipolar ion exchange membranes as separators for biological fuel cells" Environ. Sci. Technol. 42, 2008, pp. 1740-1746.
Lee H et al. "Characterization of energy losses in an upflow single-chamber microbial electrolysis cell" International journal of hydrogen energy 35 (2010) pp. 920-927.
Rabaey K et al. "Biofuel cells select for microbial consortia that self-mediate electron transfer" Applied and Environmental Microbiology, vol. 70, No. 9, Sep. 2004, pp. 5373-5382.
Liu H et al. "Power generation in fed-batch microbial fuel cells as a function of ionic strength, temperature, and reactor configuration" Environ. Sci. Technol. 2005, 39, pp. 5488-5493.
Chae J et al. "Fabrication and characterization of a wafer-level MEMS vacuum package with vertical feedthroughs" Journal of Microelectromechanical Systems, vol. 17, No. 1, Feb. 2008, pp. 193-200.
Choa S "Reliability study of hermetic wafer level MEMS packaging with through-wafer interconnect" Microsyst Technol (2009) 15: pp. 677-686.
Pei-Yuan Z et al. "Experimental study of the microbial fuel cell internal resistance" Journal of Power Sources 195 (2010) pp. 8013-8018.
Siu C et al. "A Microfabricated PDMS Microbial Fuel Cell" Journal of Microelectromechanical Systems, vol. 17, No. 6, Dec. 2008, pp. 1329-1341.
Logan B et al. "Electricity Generation Using an Air-Cathode Single Chamber Microbial Fuel Cell in the Presence and Absence of a Proton Exchange Membrane" Environ. Sci. Technol. 2004, 38, pp. 4040-4046.

\* cited by examiner

MICRO-SIZED MICROBIAL FUEL CELL

CROSS-REFERENCE TO RELATED APPLICATION

This application claims priority to U.S. Application Ser. No. 61/351,234, filed on Jun. 3, 2010, which is incorporated herein by reference.

TECHNICAL FIELD

This invention relates to micro-sized microbial fuel cells.

BACKGROUND

A microbial fuel cell (MFC) is an electrochemical device that converts organic substrates into electricity through the metabolism of anode-respiring bacteria (ARB). ARB oxidize organic substrates and then complete respiration by transferring electrons to the anode via extracellular electron transfer (EET). Many MFCs are in macro-sized forms that serve as prototypes of large power sources or wastewater treatment technology. Micromachined or microelectromechanical systems (MEMS) MFCs have been explored for use as portable power sources as well as platforms for behavioral studies of ARB.

SUMMARY

A micro-sized microbial fuel cell includes an anode portion having an anode and a cathode portion having a cathode. The anode is configured to support an electrically conductive biofilm matrix. A cation exchange membrane is positioned between the anode and the cathode. The anode portion and the cation exchange membrane define an anode chamber having a volume of between about 1 µL and about 100 µL and configured to receive an anolyte. The cathode portion and the cation exchange membrane define a cathode chamber having a volume of between about 1 µL and about 100 µL and configured to receive a catholyte. In one aspect, the microbial fuel cell is configured to achieve a Coulombic efficiency of at least 30%. In another aspect, the microbial fuel cell is configured to achieve a power density of at least of 4.7 µW/cm².

In yet another aspect, a micro-sized microbial fuel cell is fabricated by a process including forming an anode portion having an anode and forming a cathode portion having a cathode. The anode portion is formed by a process including depositing a precious metal on a surface of an anode substrate to form the anode, depositing a polymerizable material on the anode and the surface of the anode substrate, and curing a selected portion of the polymerizable material to form a gasket on the anode and/or the surface of the anode substrate. The cathode portion is formed by a process including depositing a precious metal on a surface of a cathode substrate to form the cathode, depositing a polymerizable material on the cathode and the surface of the cathode substrate, and curing a selected portion of the polymerizable material to form a gasket on the cathode and/or the surface of the cathode substrate. The anode is configured to support a biofilm matrix. A cation exchange membrane is positioned between the anode portion and the cathode portion to form an anode chamber having a volume of between about 1 µL and about 100 µL and to form a cathode chamber having a volume of between about 1 µL and about 100 µL. The anode chamber is configured to receive an anolyte, and the cathode chamber is configured to receive a catholyte. An electrically conductive pathway is formed between the anode and the cathode. The microbial fuel cell is configured to achieve a Coulombic efficiency of at least 30% and/or a power density of at least of 4.7 µW/cm².

Implementations can include one or more of the following features. The microbial fuel cell can include an anolyte in the anode chamber, a catholyte in the cathode chamber, and an electrically conductive biofilm matrix formed on the anode. The Coulombic efficiency of the microbial fuel cell is at least 30%, at least 40%, at least 50%, or at least 60%. The microbial fuel cell can be configured to achieve a current density of 30 µA/cm² or greater and/or a power density of at least of 4.7 µW/cm². In some cases, the current density of the microbial fuel cell is 30 µA/cm² or greater and/or the power density of the microbial fuel cell is at least of 4.7 µW/cm².

The electrically conductive biofilm matrix includes anode-respiring bacteria. The anolyte can include an organic substrate for the anode-respiring bacteria, an oxygen scavenger, or a combination thereof. The anode-respiring bacteria may include *Geobacter* sp., such as *Geobacter sulfurreducens*. In some cases, a majority of the anode-respiring bacteria are *Geobacter* sp., such as *Geobacter sulfurreducens*. A thickness of the biofilm matrix can be between about 5 µm and about 50 µm.

The anode and the cathode may each include a precious metal deposited on a substrate with an electron beam evaporator. A specific surface area of the anode can be about 500 cm$^{-1}$ or greater. An electrical pathway may be formed between the anode and the cathode. The microbial fuel cell can include a gasket between the anode portion and the cation exchange membrane. The gasket may be formed by spin-coating a polymerizable composition on the anode portion of the microbial fuel cell, and curing a selected portion of the polymerizable composition to form the gasket.

As described herein, a micro-sized microbial fuel cell is a microelectromechanical system. A multiplicity of micro-sized microbial fuel cells can be fabricated in an automated process using techniques such as electron beam evaporation, spin-coating, UV curing, etching, and lift-off processes, allowing mass production of low cost, high power density microbial fuel cells.

DETAILED DESCRIPTION

Figure 1A:
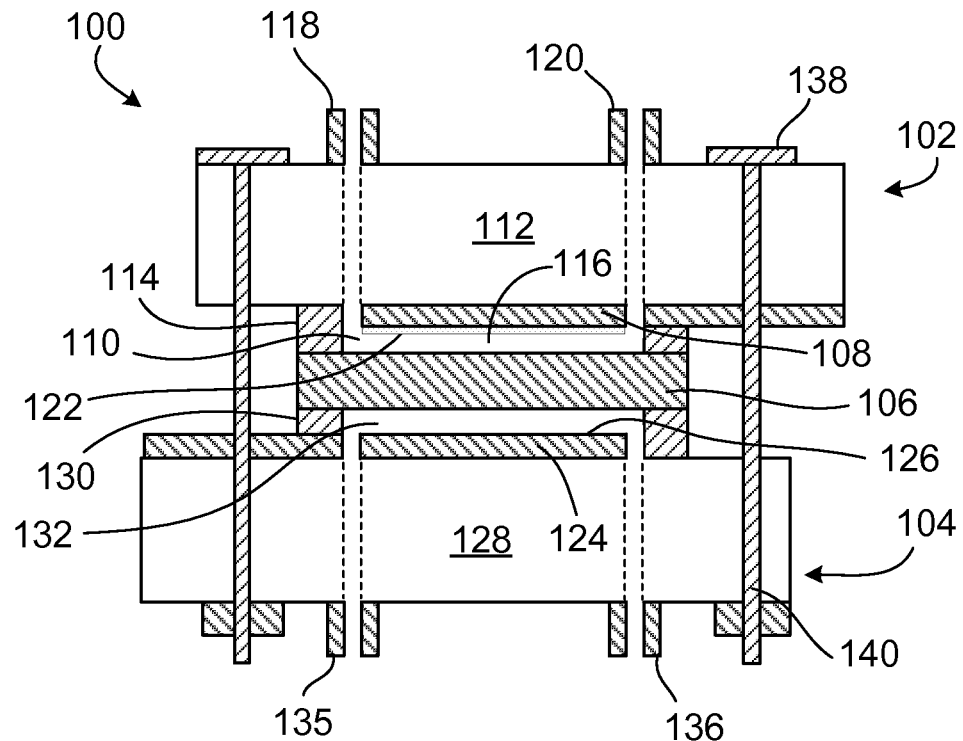
FIG. 1A shows a side view of a micro-sized MFC.

Referring to FIG. 1A, micro-sized MFC 100 includes anode portion 102 and cathode portion 104 separated by cation exchange membrane (CEM) 106. Anode portion 102 includes anode 108 and defines anode chamber 110. Anode 108 is formed on substrate 112. Gasket 114 forms a seal between anode 108 and/or substrate 112 and CEM 106. Anode chamber 110 is a microfluidic channel between CEM 106 and anode 108. Anode chamber 110 may be filled with anolyte 116. Inlet 118 and outlet 120 are coupled to anode chamber 110. Dimensions of anode 108, CEM 106, and gasket 114 may be selected to define a volume of anode chamber 110. As used herein, the volume of anode chamber 110 is defined as the volume bounded by CEM 106, anode 108, and gasket 114 (i.e., the volume does not include openings in anode 108, in substrate 112, or between the gasket and the anode). A volume of anode chamber 110 can be selected, for example, to hold between about 1 µL and about 100 µL of anolyte, between about 1 µL and about 50 µL of anolyte, between about 1 µL and about 10 µL of anolyte, or between about 1 µL and about 5 µL of anolyte. Inlet 118 and outlet 120 allow for flow of anolyte 116 to and from anode chamber 110. MFC 100 may be operated in batch, semi-continuous, or continuous mode.

Biofilm matrix 122 including anode-respiring bacteria (ARB) is formed on anode 108. Biofilm matrix 122 is electrically conductive. ARB in biofilm matrix 122 include *Geobacter* sp. such as, for example, *Geobacter sulfurreducens*. The biofilm matrix is formed with a *Geobacter*-enriched mixed bacterial culture, and may be dominated by (or have a majority of) *Geobacter* sp. such as, for example, *Geobacter sulfurreducens*. A thickness of biofilm matrix 122 can range from about 2 µm (e.g., about the thickness of one bacterium) up to about 100 µm. For example, a thickness of biofilm matrix 122 may be between about 5 µm and about 50 µm, or between about 10 µm and about 40 µm. Although a maximum thickness of biofilm matrix 122 is limited by the spacing between CEM 106 and anode 108, a thickness of the biofilm matrix may be less than the spacing between the CEM and the anode 108 to allow volume in the anode chamber for the anolyte.

Anolyte 116 includes an organic substrate for the ARB. Acetate is an example of a suitable organic substrate. Anolyte 116 may also include an oxygen scavenger. L-cysteine is an example of a suitable oxygen scavenger. The presence of oxygen scavengers reduces diversion of electrons to $H_2O$ or $H_2O_2$ in the anode chamber. Anolyte 116 may be substantially free of added electron mediators.

Cathode portion 104 of MFC 100 includes cathode 124 and defines cathode chamber 126. Cathode 124 is formed on substrate 128. Gasket 130 forms a seal between cathode 124 and/or substrate 128 and CEM 106. Cathode chamber 126 is a microfluidic channel between CEM 106 and cathode 124. Cathode chamber 126 may be filled with catholyte 132. Inlet 134 and outlet 136 are coupled to cathode chamber 126. Dimensions of cathode 124, CEM 106, and gasket 130 may be selected to define a volume of cathode chamber 126. Catholyte 132 includes an oxidant to accept electrons from the anode. Suitable oxidants include, for example, ferricyanide and oxygen. A volume of cathode chamber 126 can be selected, for example, to hold between about 1 µL and about 100 µL of catholyte, between about 1 µL and about 50 µL of catholyte, between about 1 µL and about 10 µL of catholyte, or between about 1 µL and about 5 µL of catholyte, and may be the same as or different than the volume of anode chamber 110. Inlet 134 and outlet 136 allow for flow of catholyte 132 to and from cathode chamber 126.

Figure 1B:
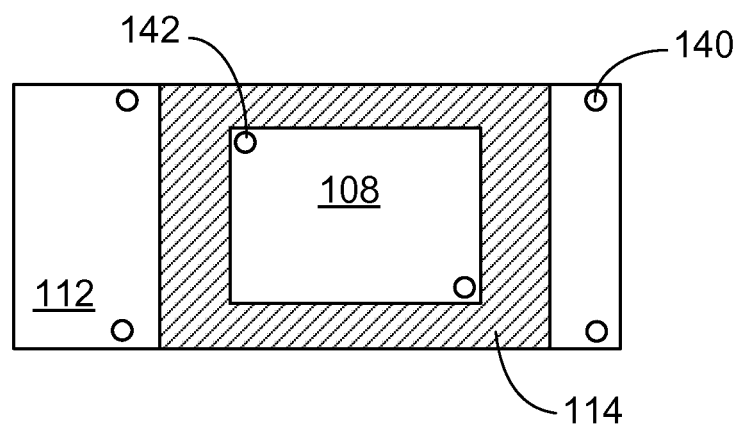
FIG. 1B shows a view of an anode of the MFC shown in FIG. 1A.

Anode portion 102 and cathode portion 104 of MFC 100 are held together by coupling members 138. Coupling members 138 may be positioned through openings 140 in substrates 112 and 128, exterior to gaskets 114 and 130. Coupling members 140 may be, for example, clamps or screws. FIG. 1B depicts a view of anode 108 on substrate 112 with gasket 114. As shown in FIG. 1B, gasket 114 is formed around anode 108, and openings 140 are arranged exterior to gasket 114. Openings 142 are coupled to ports 118 and 120, and allow flow of anolyte to and from anode chamber 110.

Figure 2A:
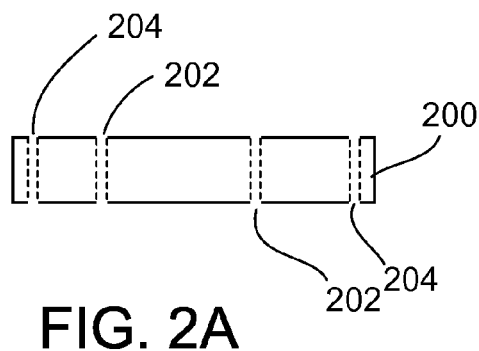
FIGS. 2A-2F show steps in a process to fabricate a micro-sized MFC.
Figure 2B:
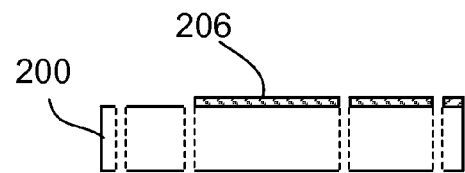

FIGS. 2A-2F show steps in fabrication of micro-sized MFC 100. The fabrication process of MFC 100 includes microelectromechanical (MEMS) device fabrication technologies that allow miniaturization, economical mass production, and large surface-area-to-volume ratio. In FIG. 2A, substrate 200 is selected. Dimensions of substrate 200 may be, for example, 100 mm×100 mm×5 mm or smaller. Openings 202 and 204, for electrolyte inlet/outlet and coupling members, respectively, are formed in substrate 200. Suitable materials for substrate 200 include, for example, glass, silicon, and polymeric materials such as polyimide, polydimethylsiloxane (PDMS), and the like. In FIG. 2B, electrode 206 is formed on substrate 200. Electrode 206 may include, for example, one or more layers of precious metal deposited by an electron-beam evaporator and patterned to define the electrode by a lift-off process, which lifts off the thin film metal using a sacrificial layer such as photo-definable materials. A thickness of the precious metal may be, for example, about 1000 nm or less. In an example, a thickness of the precious metal is about 200 nm. The electrode may be fabricated to achieve a surface-area-to volume ratio of about 500 $cm^{-1}$ or greater.

Figure 2C:
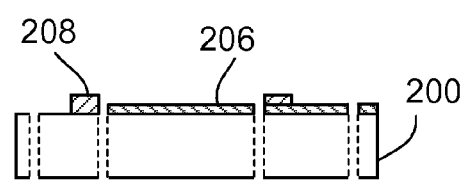
Figure 2D:
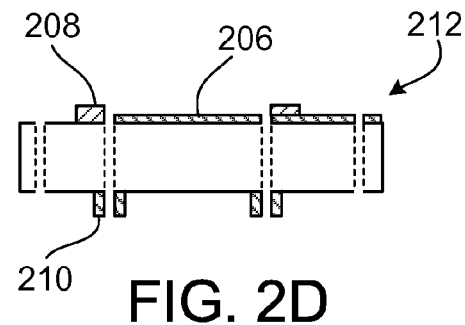
Figure 2E:
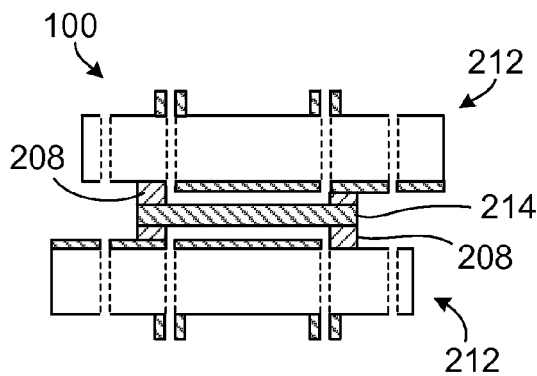

As shown in FIG. 2C, gasket 208 is formed on substrate 200 and electrode 206. In an example, gasket 208 is formed by spin-coating a polymerizable material on the substrate. The polymerizable may be photo-definable or UV curable material. The thickness of the polymerizable material may be adjusted by adjusting the spin speed in the spin-coating process. The polymerizable material may be masked to achieve desired dimensions, cured, and further processed. A thickness of gasket 208 can be used to determine a depth—and thus a volume—of the electrode chamber. A thickness of gasket 208 may be, for example, about 200 µm or less, about 50 µm or less, or about 5 µm or less. As shown in FIG. 2D, ports 210 are coupled to openings 202 to form electrode assembly 212. Ports 210 may be, for example, nanoports, capable of coupling to fluidic tubing with an outer diameter of about 0.25 mm or less.

Figure 2F:
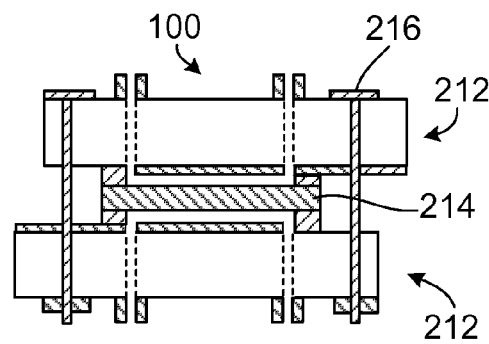

Two electrode assemblies 212 may be prepared as described in FIGS. 2A-2D. Cation exchange membrane 214 is then positioned between electrode assemblies 212 to form MFC 100, with gaskets 208 forming a seal between the electrode assemblies and the cation exchange membrane. Suitable materials for cation exchange membrane 214 include, for example, CMI 7000 (available from Membranes International, Inc.) and proton exchange membranes such as NAFION (available from DuPont). As shown in FIG. 2F, coupling members 216 are positioned through openings 204 to secure electrode assemblies 212 to cation exchange membrane 214. A thickness of gaskets 208 and a surface area of electrodes 206 may be selected to achieve a desired ratio of distance between electrodes to cross-sectional area through which ionic conduction occurs. In addition, a thickness of gaskets 208 may be selected to allow growth of a biofilm matrix of a desired thickness, while leaving sufficient space between the biofilm matrix and the CEM to allow flow of the electrolyte through the electrode chamber.

Figure 3:
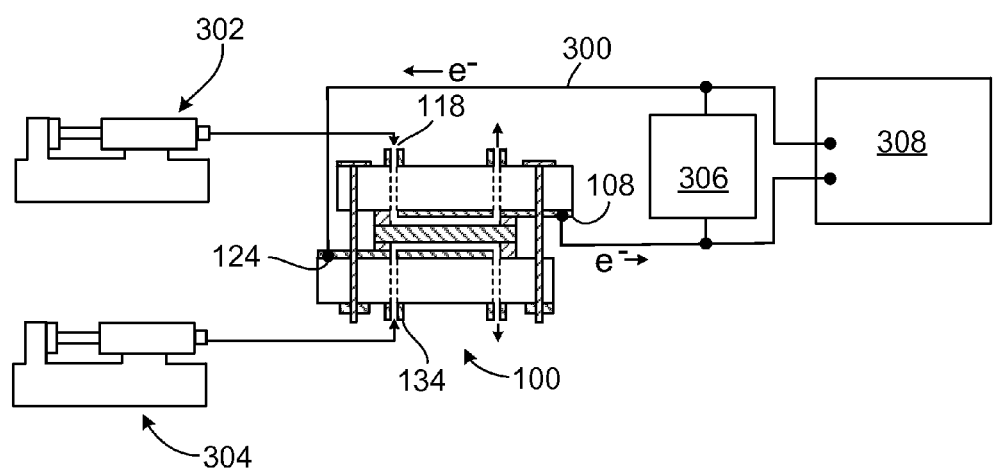
FIG. 3 depicts apparatus for monitoring MFC power generation.

FIG. 3 shows MFC 100, with electrical pathway 300 between anode 108 and cathode 124. Anolyte source 302 is coupled to inlet 118, and catholyte source 304 is coupled to inlet 134. Load 306 is positioned in electrical pathway 300. During operation, current through load 306 may be calculated with data from multimeter 308. The anode chamber of MFC 100 may be held at a temperature between about 25° C. and about 30° C. during operation.

In an example, the anolyte includes acetate as a substrate for ARB, and the catholyte includes ferricyanide. The anolyte and catholyte are provided to the MFC in a batch, semi-continuous, or continuous mode. The acetate is oxidized by ARB as shown below:

$$CH_3COO^- + 2H_2O \rightarrow 2CO_2 + 8\,e^- + 7H^+.$$

Electrons transferred to the anode via the ARB conductive matrix flow to the cathode through load 306. Protons travel through the CEM towards the cathode, and the redox couple is completed when captured electrons reduce ferricyanide $[Fe(CN)_6]^{3-}$, as shown below:

$$[Fe(CN)_6]^{3-} + e^- \rightarrow [Fe(CN)_6]^{4-}.$$

As noted above, oxidizing and reducing agents can be used instead of (or together with) acetate and ferricyanide.

Columbic efficiency (CE) of an MFC can be calculated as:

$$CE = (C_P/C_T) \times 100\%,$$

in which $C_P$ is the total charge in coulombs calculated by integrating the current over the time for acetate consumption, and $C_T$ is the theoretical charge in coulombs that can be produced from the complete oxidation of acetate. With acetate as an example of the oxidizing agent, $C_T$ is calculated as:

$$C_T = V \cdot b \cdot A \cdot E \cdot (\text{mol}_{acetate}),$$

in which V is the volume of anode chamber, b is the number of moles of electrons produced by oxidation of acetate (b=8 mol-$e^{-1}$/mol), A is Avogadro's number (6.023×10$^{23}$ molecules/mole), E is electron charge (1.6×10$^{-19}$ C/electrons), and mol$_{acetate}$ is the moles of acetate oxidized.

High internal resistance in a MFC can result in reduced power output. The internal resistance consists of non-ohmic and ohmic resistances. Non-ohmic resistance includes charge-transfer and diffusion resistances, which can be reduced by increasing anode surface-area-to-volume ratio, or the specific surface area. A large specific surface area can lower the impact of mass-transport resistances by allowing smaller fluxes of reactants and products. The voltage across an ion exchange membrane is defined as the potential difference between the anode and cathode electrodes, and ohmic resistance can be written as:

$$\Delta V_\Omega = \frac{d \cdot I}{K \cdot A},$$

in which d is the distance between electrodes, I is the current, K is the conductivity of solutions, and A is the cross-sectional area (cm$^2$) through which ionic conduction occurs. The ohmic resistance is proportional to the distance between electrodes and is inversely proportional to the anode area. Therefore, ohmic resistance can be reduced by decreasing the ratio d/A.

Micro-sized MFCs described herein can achieve high current density (e.g., at least 16,000 μA/cm$^3$ or at least 33 μA/cm$^3$, high power density (e.g., at least 2300 μW/cm$^3$ or at least 4.7 μW/cm$^2$), and enhanced CE (e.g., at least 30%, at least 40%, at least 50%, or at least 60%) by a combination of features, including an electrically conductive biofilm matrix, an oxygen scavenger, a high specific surface area anode (e.g., at least 500 cm$^{-1}$) and a low d/A value (e.g., 0.0009 cm$^{-1}$ or lower).

In an example, a micro-sized MFC similar to MFC 100 was formed by sandwiching a CEM between two glass chips pre-fabricated with gold electrodes. Each glass chip had a 4.5-μL chamber defined by a 20-μm-thick PDMS gasket. Independent supplies of anolyte and catholyte were flowed through the separate microfluidic pathways at the top and bottom of the MFC.

In more detail, two glass chips (VWR, 75 mm×25 mm×1 mm) were cut to dimensions of 45 mm×25 mm, and six holes were mechanically drilled six holes in each chip: one inlet, one outlet, and four openings for screws. The glass chips were coated with titanium (20 nm), and then gold (200 nm) with an electron-beam evaporator. The precious metal layer was then patterned to define the electrodes (1.5 cm×1.5 cm) using a lift-off process. PDMS (WL-5150, Dow Corning) was spin-coated on the coated glass chips at 750 rpm for 30 sec. This PDMS layer was used for a gasket, and the thickness of the layer was controlled by the spin speed. The PDMS layer was pre-baked at 110° C. for 120 sec prior to UV exposure (3000 mJ/cm$^2$) through a negative photo-mask. Following exposure, the substrate was baked at 150° C. for 180 sec and agitated in a developer (WL-9653, Dow Corning) for 30 sec. Finally, the PDMS-coated glass chips were cured at 180° C. for 1 hr.

The thickness of the PDMS was 20 μm, corresponding to the depth of the anode/cathode chamber. The inlet and outlet of the microfluidic channel were formed on the backside of the chips via nanoports (10-32 Coned assembly, IDEX Health & Science) and connected with fluidic tubing (outer diameter: 0.0625 inch, inner diameter: 0.002 inch, 1548, IDEX Health & Science). CMI 7000 (Membranes international Inc.) was used as the CEM to allow cation transport for maintaining electroneutrality in both chambers. The surface area of the CEM was 1.7 cm×1.7 cm. To assemble the dual-chamber MFC, the CEM was sandwiched between the anode and cathode chamber and with four screws. The MFC was operated at 30° C.

Inoculum was obtained from an acetate-fed MFC mother reactor that had *Geobacter*-enriched mixed bacterial culture from anaerobic digester sludge. The inoculum was a mixed bacterial culture dominated by *Geobacter sulfurreducens*. The anode chamber was fed with acetate as the sole electron donor. For fed-batch operation, 25 mM acetate in mineral medium was used. The same concentration media was fed using a syringe pump (Harvard Apparatus, Inc.) for semi-continuous operation. The composition of the mineral medium was (per liter of deionized water): 1680 mg KH$_2$PO$_4$, 12,400 mg Na$_2$HPO$_4$, 1600 mg NaCl, 380 mg NH$_4$Cl, 5 mg EDTA, 30 mg MgSO$_4$.7H$_2$O, 5 mg MnSO$_4$.H$_2$O, 10 mg NaCl, 1 mg CO(NO$_3$)$_2$, 1 mg CaCl$_2$, 0.001 mg ZnSO$_4$.7H$_2$O, 0.001 mg ZnSO$_4$.7H$_2$O, 0.1 mg CuSO$_4$.5H$_2$O, 0.1 mg AlK (SO$_4$)$_2$, 0.1 mg H$_3$BO$_3$, 0.1 mg Na$_2$MoO$_4$.2H$_2$O, 0.1 mg Na$_2$SeO$_3$, 0.1 mg Na$_2$WO$_4$.2H$_2$O, 0.2 mg NiCl$_2$.6H$_2$O, and 1 mg FeSO$_4$.7H$_2$O. 2.5 g/L of L-cysteine was added to the anolyte to scavenge dissolved oxygen in the anode chamber. The catholyte was 100 mM ferricyanide in a 100 mM phosphate buffer in which the pH was adjusted to 7.5±0.2 with 0.1 M NaOH. Anolyte and catholyte solutions were continuously supplied using the syringe pump at the rate of 1.5 μL/min, in an arrangement similar to that shown in FIG. 3.

The potential between the anode and cathode was measured using a data acquisition system (DAQ/68, National Instrument), and recorded every 1 min via LabVIEW. An external resistor, connected between the electrodes of the MFC, closed the circuit. Current through the resistor was calculated via Ohm's law and the output power: P=V×I. Current and power density were normalized to the anode area (2.25 cm$^2$) or anode chamber volume (4.5 μL). In the batch-fed mode, anolyte and catholyte were injected to fill the 4.5-μL anode/cathode chambers by the syringe pump, and then sealed the ends of the tubing using silicone.

To calculate $C_P$, the output current of the batch mode was monitored and the area of the current versus run time curve was integrated to calculate the total charge generated by the ARB. The minimum CE was computed by assuming that all of the acetate was consumed during each batch experiment. However, due to acidification of the anode chamber when using a CEM, all of the acetate may not have been consumed. Based on buffer and acetate concentration, it was estimated that about 12 mM acetate was consumed in the MFC before the anode pH dropped below 5.5 and inhibited ARB. Therefore, a minimum CE is reported due to the incomplete acetate consumption resulting from acidification of the anode chamber. The inoculum and anolyte contained L-cysteine, which can react with the anode electrochemically. The current generated with L-cysteine-only medium was measured and subtracted from the total current generated with the medium that contained acetate and L-cysteine together.

The open circuit voltage (OCV=cathode potential minus anode potential with an infinite load) in the batch-mode micro-sized MFC was compared with and without L-cysteine, the $O_2$ scavenger, in the anolyte. ARB were not inoculated in the anode chamber for these experiments, in which the cathode potential was controlled by ferricyanide at about 0.3 V. The OCV was approximately 300 mV without L-cysteine, but approximately 600 mV in the presence of L-cysteine. This result suggests that $O_2$ was penetrating into the anode chamber and abiotically reacting with the anode, since the anode potential was negative enough (−0.3 to −0.1 V versus the standard hydrogen electrode (SHE)) to reduce $O_2$ into $H_2O$.

Figure 4A:
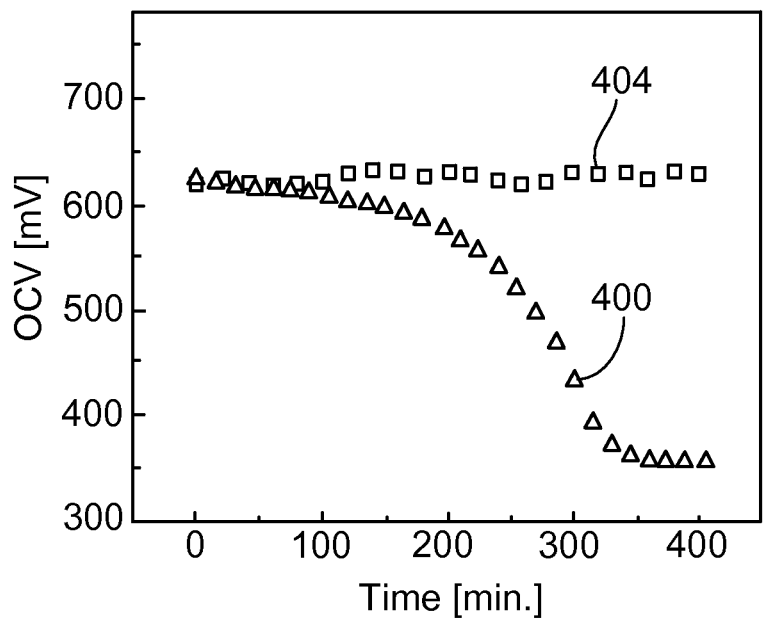
FIG. 4A shows plots of open current voltage (OCV) of a MFC for semi-continuous and batch mode in the presence of an oxygen scavenger and without ARB.
Figure 4B:
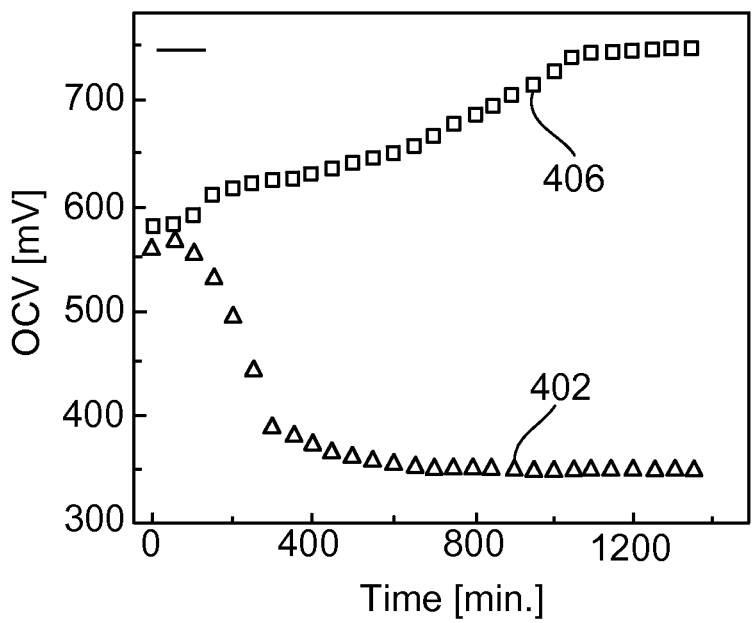
FIG. 4B shows plots of open current voltage (OCV) of a MFC for semi-continuous and batch mode in the presence of an oxygen scavenger and with ARB.

OCV of the MFC in fed-batch- and semi-continuous-mode were measured in real time. As shown in FIGS. 4A and 4B, the OCV pattern for the fed-batch MFCs was similar for the MFCs not having ARB (plot 400 in FIG. 4A) and having ARB (plot 402 in FIG. 4B). The OCV was high (570 mV-580 mV) immediately after the anolyte and catholyte, which had been sparged with $N_2$ for 15 min, were injected to fill the chambers. Although the ends of all tubing were sealed with silicone in order to minimize $O_2$ intrusion to the anolyte and catholyte, the initial OCV declined to 350 mV in 315 min. This suggests that the amount of L-cysteine was not enough to scavenge all $O_2$ intruded in the anode chamber under the fed-batch mode over time, allowing the intruded $O_2$ to abiotically react with the anode to increase the anode potential and decrease the OCV.

For semi-continuous-flow, the OCV was either constant with no ARB (plot 404 in FIG. 4A) or increased with ARB (plot 406 in FIG. 4B). Semi-continuous flow helped keep a high flow by flushing out $O_2$ intruded to the anode and by providing a renewed source of L-cysteine. The OCV of the semi-continuous-mode MFC having ARB increased, reaching 745 mV (FIG. 4B).

Figure 5:
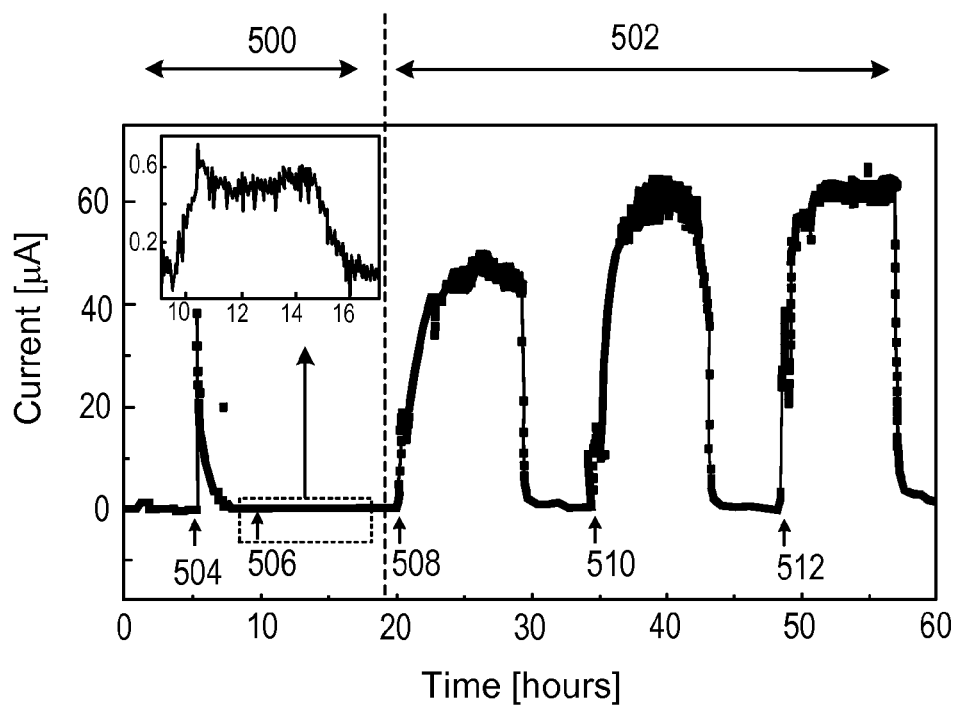
FIG. 5 shows current produced from a micro-sized MFC with a 150Ω load during semi-continuous operation.

FIG. 5 shows transient current generation (150-Ω load) with a micro-sized microbial fuel cell. Biofilm formation occurs in batch operation region 500. Current generation occurs in semi-continuous operation region 502. The inoculum and anolyte (including L-cysteine) were injected 504 at an elapsed time of about 5 hours. Once the current reached 0.5 μA, about 5 hours after the injection (see insert for magnified current-generation profile 506), fresh anolyte (a mixture of 25 mM acetate and 2.5 g/L L-cysteine in mineral medium) was fed to the anode chamber. After an elapsed time of about 20 hours, semi-continuous operation was begun in which anolyte and catholyte solution were fed continuously to the chambers at 1.5 μL/min, with anolyte and catholyte refills shown at 508, 510, and 512. The current increased to 49 μA (22 μA/cm$^2$ or 11,000 μA/cm$^3$) approximately 5 hours after the semi-continuous feed of anolyte/catholyte 508. Once the current dropped to the baseline, when the anolyte/catholyte solutions were depleted in the 1-mL syringes, the syringes were refilled and fresh anolyte/catholyte was again injected into both chambers at 510, following which the current reached a peak value of 64 μA (28.3 μA/cm or 14,000 μA/cm$^3$), after an elapsed time of about 2 days. During the third cycle indicated by 512, the current increased more rapidly and stabilized more quickly than in the second cycle. The maximum current in the third cycle was about 67 μA (30 μA/cm$^2$ or 15 μA/cm$^3$). Repeated cycles of anolyte/catholyte supply continued to show good reproducibility of current generation for 15 days (not shown). This reproducible current generation suggests that ARB reached sufficient accumulation at the anode to allow oxidation of the acetate at their maximum rate and transfer of electrons to the anode in one feed cycle. The current enhancement during the inoculation period and first two cycles 508, 510 suggests that ARB proliferated on the anode. FIG. 5 also indicates that the MFC exhibited a start-up time of about 40 hrs.

To calculate CE of the micro-sized MFC, the output current of the fed-batch mode was monitored and the area of the current vs. run time curve was integrated to calculate the total charge generated by ARB, $C_P$. CE was computed by assuming that all of the acetate was consumed during each cycle of fed-batch feeding. The micro-sized MFC has a short diffusion path for acetate owing to the 20-μm-thick PDMS spacer. As such, diffusion of acetate was not considered to be limiting. The inoculum and anolyte contained L-cysteine, which can react with the anode electrochemically. Thus, the current generated with L-cysteine-only medium was measured and subtracted from the total current generated with the medium that contained acetate and L-cysteine together.

Figure 6:
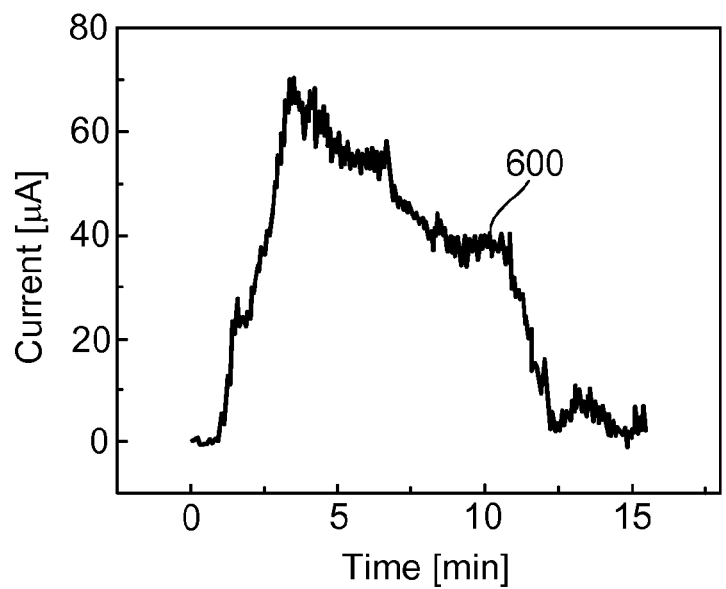
FIG. 6 shows current vs. run time in batch operation of a micro-sized MFC.

FIG. 6 shows plot 600 of current versus run time under the fed-batch mode for the anode. Ferricyanide was provided to the cathode at 0.5 μL/min to facilitate acceptance at the cathode of substantially all of the electrons generated at the anode (25 mM acetate; 200 e$^-$ meq/L and 100 mM ferricyanide; 100 e$^-$ meq/L). Integrating the area of the current vs. run time curve (489×10$^{-6}$ C·m·s$^{-1}$×60 s·m$^{-1}$) gave the total charge generated of $C_P$=0.029 C. The L-cysteine-only media generated 2.7 μA (data not shown here), which is smaller than the current generated by a mixture of L-cysteine and acetate of up to 70 μA (FIG. 6). This supports that L-cysteine may have been used mostly to scavenge the dissolved oxygen in the anode chamber. These observation yields the charge generated by consuming acetate to be $C_P$=0.027 C ((489×10$^{-6}$ C·m·s$^{-1}$−2.7 μA×15.4 min)×60 s·m$^{-1}$)). Thus, the total available charge from 25 mM acetate was:

$$4.5 \times 10^{-6} L \times \frac{0.025 \text{ mole}}{L} \times 6.023 \times 10^{23} \frac{\text{molecules}}{\text{mole}} \times 8 \frac{\text{electron}}{\text{molecules}} \times 1.6 \times 10^{-19} \frac{C}{\text{electron}} = 0.087C,$$

and the CE of the MEMS MFC was calculated as:

$$\frac{0.027C}{0.087C} \times 100 = 31\%.$$

However, since it can be reasonably estimated that only about one-half of the acetate was oxidized before the anode chamber was acidified enough to stop ARB metabolism, it is reasonably expected that the actual CE was about twice this, or at least 60%.

Figure 7:
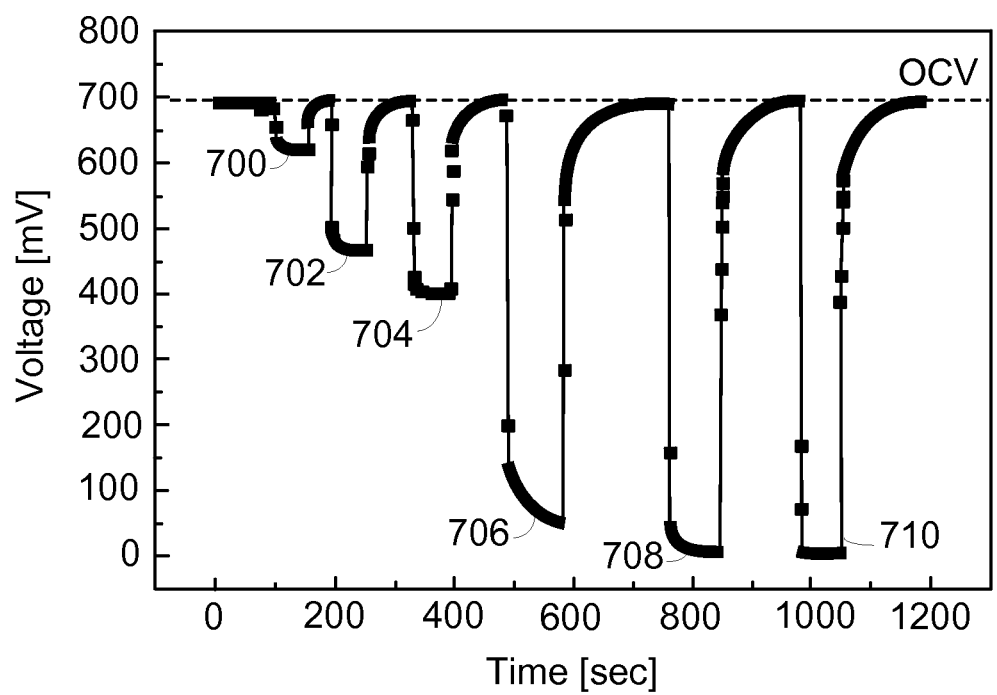
FIG. 7 shows voltage response to different load resistors for a micro-sized MFC.

To generate results for polarization curves, the voltage response with different external resistances was obtained for a micro-sized MFC having a continuous feed of anolyte to the anode. These results are shown in FIG. 7. External resistors for portions 700, 702, 704, 706, 708, and 710 of the plot were 470 kΩ, 33 kΩ, 15 kΩ, 810 Ω, 150Ω, and 15Ω, respectively. An OCV of 690 mV was reached repeatedly as the resistances were removed from the MFC. The output voltage increased as the resistances increased ($V=IR_{ext}$, where $R_{ext}$ is the resistance of the external resistor).

Figure 8A:
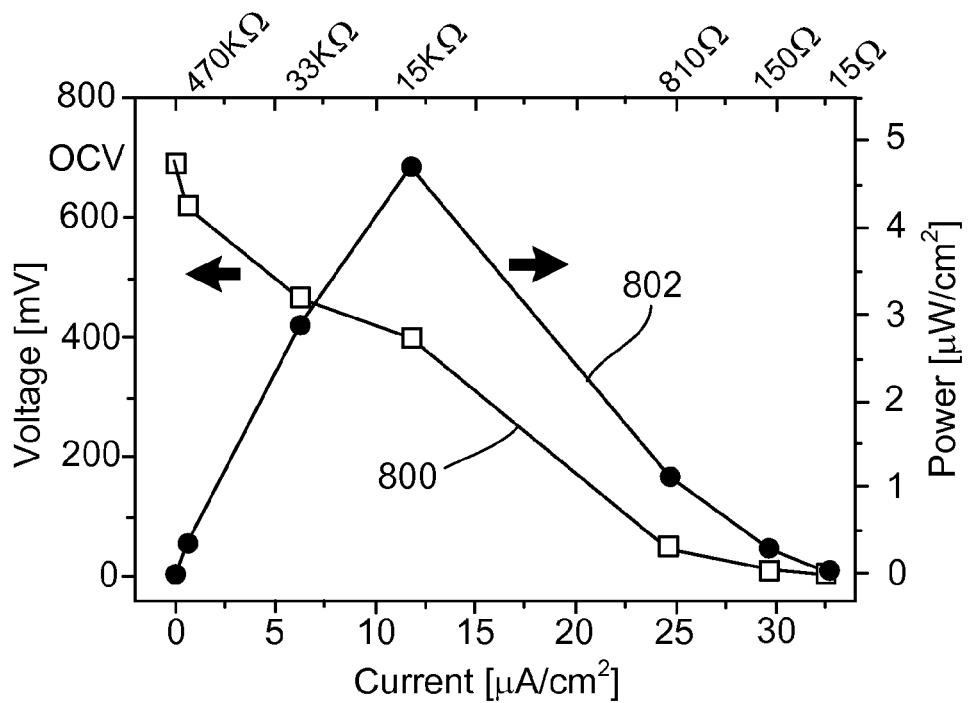
FIG. 8A shows polarization and power output per anode area for a micro-sized MFC.
Figure 8B:
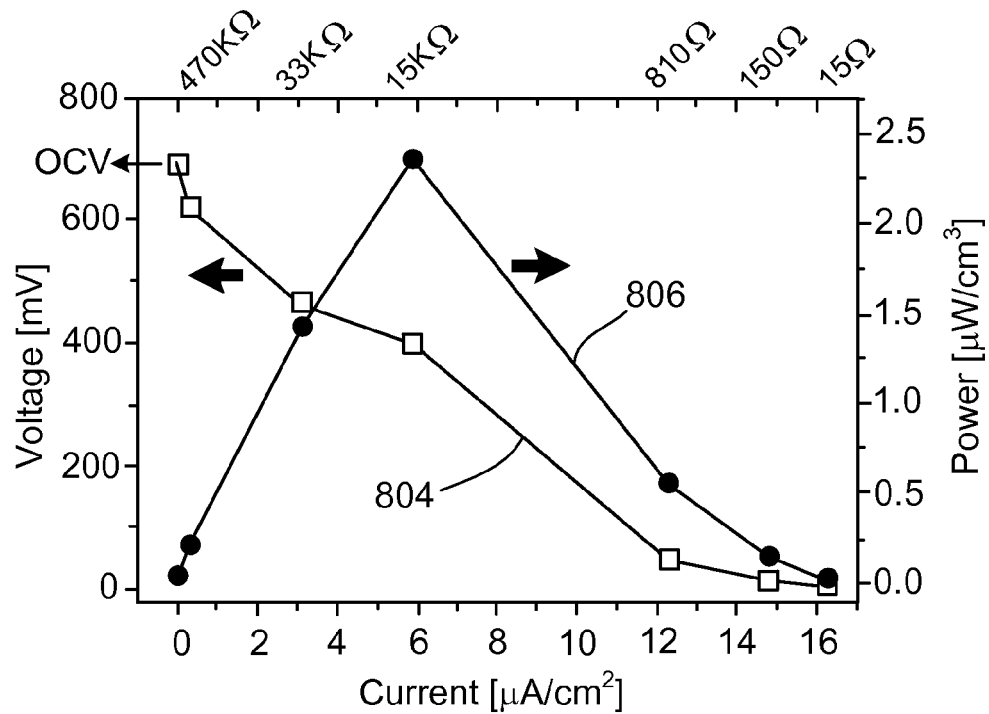
FIG. 8B shows polarization and power output per anode volume for a micro-sized MFC.

FIG. 8A shows polarization curve 800 and power density 802 per anode surface area (2.25 cm$^2$) as a function of current. FIG. 8B shows polarization curve 804 and power density 806 per anode volume (4.5 μL) as a function of current. The OCV is shown on the voltage axis, and external resistance (470 kΩ, 33 kΩ, 15 kΩ, 810Ω, 150Ω, and 15Ω) is shown at the top corresponding to points in curves 800, 802, 804, and 806. Values shown in FIGS. 8A and 8B were derived and calculated based on the maximum current value at a given external resistance (FIG. 7). The output voltage of the micro-sized MFC depended on the external resistance, as expected. The maximum power density per anode area was 4.7 μW/cm$^2$ at a current density of 12 μA/cm$^2$ and a voltage of 400 mV ($R_{ext}$=15 kΩ), as shown in FIG. 8A. The maximum current density reached up to 33 μA/cm$^2$ for a 15Ω resistor. FIG. 8B shows a maximum volumetric power density of 2,300 μW/cm$^3$.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this application.

What is claimed is:

1. A microbial fuel cell comprising:
   an anode portion comprising an anode, wherein a specific surface area of the anode is about 500 cm$^{-1}$ or greater;
   a cathode portion comprising a cathode, wherein the ratio of the distance between the anode and the cathode to the cross-sectional area (cm$^2$) through which ionic conduction occurs is 0.0009 cm$^{-1}$ or lower;
   a cation exchange membrane positioned between the anode and the cathode, wherein the anode portion and the cation exchange membrane define an anode chamber having a volume of between about 1 μL and about 100 μL, and the cathode portion and the cation exchange membrane define a cathode chamber having a volume of between about 1 μL and about 100 μL;
   an anolyte in the anode chamber, the anolyte comprising L-cysteine as an oxygen scavenger;
   a catholyte in the cathode chamber; and
   an electrically conductive biofilm formed on the anode and comprising anode-respiring bacteria comprising *Geobacter* sp.,
   wherein the Coulombic efficiency of the microbial fuel cell is at least 30%.

2. The microbial fuel cell of claim 1, wherein the Coulombic efficiency of the microbial fuel cell is at least 40%.

3. The microbial fuel cell of claim 1, wherein the Coulombic efficiency of the microbial fuel cell is at least 50%.

4. The microbial fuel cell of claim 1, wherein the Coulombic efficiency of the microbial fuel cell is at least 60%.

5. The microbial fuel cell of claim 1, wherein the anolyte comprises an organic substrate for the anode-respiring bacteria.

6. The microbial fuel cell of claim 1, wherein the *Geobacter* sp. comprise *Geobacter sulfurreducens*.

7. The microbial fuel cell of claim 1, wherein a thickness of the biofilm is between about 5 μm and about 50 μm.

8. The microbial fuel cell of claim 1, wherein the anode and the cathode each comprises a precious metal deposited on a substrate with an electron beam evaporator.

9. The microbial fuel cell of claim 1, further comprising an electrical pathway between the anode and the cathode.

10. The microbial fuel cell of claim 1, wherein the microbial fuel cell achieves a current density of 30 μA/cm$^2$ or greater.

11. The microbial fuel cell of claim 1, wherein the microbial fuel cell achieves a power density of 4.7 μW/cm$^2$ or greater.

12. The microbial fuel cell of claim 1, further comprising a gasket between the anode portion and the cation exchange membrane, wherein the gasket is formed by spin-coating a polymerizable composition on the anode portion of the microbial fuel cell, and curing a selected portion of the polymerizable composition.

13. The microbial fuel cell of claim 1, wherein the micro-sized microbial fuel cell is a microelectromechanical system fabricated in a mass production process.

14. A microbial fuel cell comprising:
   an anode portion comprising an anode, wherein a specific surface area of the anode is about 500 cm$^{-1}$ or greater;
   a cathode portion comprising a cathode, wherein the ratio of the distance between the anode and the cathode to the cross-sectional area (cm$^2$) through which ionic conduction occurs is 0.0009 cm$^{-1}$ or lower;
   a cation exchange membrane positioned between the anode and the cathode, wherein the anode portion and the cation exchange membrane define an anode chamber having a volume of between about 1 μL and about 100 μL, and the cathode portion and the cation exchange membrane define a cathode chamber having a volume of between about 1 μL and about 100 μL;
   an anolyte in the anode chamber, the anolyte comprising L-cysteine as an oxygen scavenger;
   a catholyte in the cathode chamber; and an electrically conductive biofilm formed on the anode and comprising anode-respiring bacteria comprising *Geobacter* sp., wherein the power density of the microbial fuel cell is 4.7 $\mu W/cm^2$ or greater.

* * * * *